(12) United States Patent
Liu et al.

(10) Patent No.: US 10,136,114 B2
(45) Date of Patent: Nov. 20, 2018

(54) PROJECTION DISPLAY COMPONENT AND ELECTRONIC DEVICE

(71) Applicant: MEDIATEK INC., Hsinchu (TW)

(72) Inventors: Tsu-Ming Liu, Hsinchu (TW); Chih-Kai Chang, Taichung (TW); Chi-Cheng Ju, Hsinchu (TW); Chih-Ming Wang, Hsinchu County (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 14/902,591

(22) PCT Filed: May 27, 2015

(86) PCT No.: PCT/CN2015/079940
§ 371 (c)(1),
(2) Date: Jan. 3, 2016

(87) PCT Pub. No.: WO2015/180646
PCT Pub. Date: Dec. 3, 2015

(65) Prior Publication Data
US 2016/0182872 A1    Jun. 23, 2016

Related U.S. Application Data

(60) Provisional application No. 62/003,260, filed on May 27, 2014, provisional application No. 62/034,952, filed on Aug. 8, 2014.

(51) Int. Cl.
*H04N 9/31* (2006.01)
*G02B 27/01* (2006.01)
(Continued)

(52) U.S. Cl.
CPC ........... *H04N 9/3173* (2013.01); *G02B 27/01* (2013.01); *G03B 21/145* (2013.01); *G03B 21/28* (2013.01);
(Continued)

(58) Field of Classification Search
CPC .. G03B 21/145; G03B 21/28; H04N 13/0059; H04N 13/0282; H04N 9/3141;
(Continued)

(56) References Cited

U.S. PATENT DOCUMENTS 5,851,060 A   12/1998   Uchiyama et al.
6,992,837 B2   1/2006   Yoon
(Continued)

FOREIGN PATENT DOCUMENTS

CN   1484059 A   3/2004
CN   1957297 A   5/2007
(Continued)

OTHER PUBLICATIONS

"International Search Report" dated Aug. 19, 2015 for International application No. PCT/CN2015/079942, International filing date:May 27, 2015.
(Continued)

*Primary Examiner* — Xuemei Zheng
(74) *Attorney, Agent, or Firm* — Oblon, McClelland, Maier & Neustadt, L.L.P.

(57) ABSTRACT

A projection display component of an electronic device includes a carrier and a first cover. The carrier is arranged to carry the electronic device. The first cover is arranged to partially reflect a projected image from the electronic device. The first cover is attached to the carrier via a first hinge set.

5 Claims, 15 Drawing Sheets

(51) Int. Cl.
   *G06F 3/01*      (2006.01)
   *H04N 13/161*    (2018.01)
   *H04N 13/194*    (2018.01)
   *H04N 13/243*    (2018.01)
   *H04N 13/282*    (2018.01)
   *G03B 21/14*     (2006.01)
   *G03B 21/28*     (2006.01)
   *G06F 3/16*      (2006.01)
   *H04N 13/349*    (2018.01)
   *H04N 13/363*    (2018.01)

(52) U.S. Cl.
   CPC .............. *G06F 3/017* (2013.01); *G06F 3/167* (2013.01); *H04N 9/3141* (2013.01); *H04N 9/3155* (2013.01); *H04N 9/3179* (2013.01); *H04N 9/3185* (2013.01); *H04N 9/3194* (2013.01); *H04N 13/161* (2018.05); *H04N 13/194* (2018.05); *H04N 13/243* (2018.05); *H04N 13/282* (2018.05); *H04N 13/349* (2018.05); *H04N 13/363* (2018.05); *G02B 2027/011* (2013.01); *G02B 2027/014* (2013.01); *G02B 2027/0118* (2013.01)

(58) Field of Classification Search
   CPC ............ H04N 9/3173; H04N 13/0459; G02B 27/2292; G06F 3/017
   See application file for complete search history.

(56) References Cited

U.S. PATENT DOCUMENTS

| | | |
|---|---|---|
| 7,396,133 B2 | 7/2008 | Burnett |
| 7,883,212 B2 | 2/2011 | O'Connell et al. |
| 8,194,001 B2 | 6/2012 | Miller |
| 8,251,514 B2 | 8/2012 | Murakami |
| 8,322,863 B1 | 12/2012 | Cho |
| 8,827,465 B2 | 9/2014 | Jikuya |
| 8,911,096 B2 | 12/2014 | Uchiyama |
| 9,030,465 B2 * | 5/2015 | Hess .................. B60K 35/00 345/419 |
| 9,058,687 B2 | 6/2015 | Kruglick |
| 9,134,598 B2 | 9/2015 | Zheng |
| 9,429,832 B2 | 8/2016 | Hirata |
| 9,430,096 B2 | 8/2016 | Murase |
| 9,483,080 B2 | 11/2016 | Kwong |
| 9,678,703 B2 | 6/2017 | Zhang |
| 9,717,981 B2 | 8/2017 | Robbins |
| 2004/0141160 A1 | 7/2004 | Yoneyama |
| 2005/0030494 A1 | 2/2005 | Kumai |
| 2008/0018591 A1 | 1/2008 | Pittel |
| 2008/0068372 A1 | 3/2008 | Krah |
| 2009/0080071 A1 | 3/2009 | Taira |
| 2009/0219985 A1 | 9/2009 | Swaminathan |
| 2010/0067181 A1 * | 3/2010 | Bair ...................... G06F 1/1616 361/679.3 |
| 2010/0171937 A1 * | 7/2010 | Hirata .................... G02B 13/16 353/70 |
| 2010/0253688 A1 | 10/2010 | Cui et al. |
| 2011/0043766 A1 | 2/2011 | Itoh |
| 2011/0063580 A1 | 3/2011 | Amano et al. |
| 2011/0149207 A1 | 6/2011 | Kawasumi |
| 2011/0242102 A1 * | 10/2011 | Hess ...................... B60K 35/00 345/419 |
| 2012/0092567 A1 | 4/2012 | Jikuya |
| 2012/0200592 A1 | 8/2012 | Kimura |
| 2012/0262555 A1 | 10/2012 | Chien |
| 2012/0300275 A1 | 11/2012 | Villardell |
| 2013/0100248 A1 | 4/2013 | Kadono |
| 2013/0127716 A1 | 5/2013 | Nagashima |
| 2013/0194252 A1 * | 8/2013 | Kim .................. G06T 15/00 345/419 |
| 2013/0215156 A1 | 8/2013 | Li |
| 2013/0241943 A1 | 9/2013 | Okamura |
| 2013/0278631 A1 | 10/2013 | Border |
| 2014/0002800 A1 | 1/2014 | Edwards |
| 2014/0035972 A1 | 2/2014 | Hasegawa |
| 2014/0146294 A1 | 5/2014 | Hirata |
| 2014/0176918 A1 | 6/2014 | Ozawa |
| 2014/0347501 A1 | 11/2014 | Ishida |
| 2015/0268838 A1 * | 9/2015 | Wang .................. G06F 3/04847 715/763 |
| 2016/0004148 A1 | 1/2016 | Chiu et al. |
| 2016/0062117 A1 * | 3/2016 | Imasaka ............. G02B 27/0101 345/7 |
| 2016/0182872 A1 | 6/2016 | Liu et al. |
| 2016/0196541 A1 * | 7/2016 | Akashika ............... G06Q 20/36 705/42 |
| 2016/0223889 A1 | 8/2016 | Fukui |
| 2017/0006267 A1 | 1/2017 | Lim |

FOREIGN PATENT DOCUMENTS

| | | |
|---|---|---|
| CN | 101256672 A | 9/2008 |
| CN | 101311769 A | 11/2008 |
| CN | 101398596 A | 4/2009 |
| CN | 101738838 A | 6/2010 |
| CN | 101776839 A | 7/2010 |
| CN | 201594167 U | 9/2010 |
| CN | 102053472 A | 5/2011 |
| CN | 102109750 A | 6/2011 |
| CN | 102143374 A | 8/2011 |
| CN | 102520900 A | 6/2012 |
| CN | 102740154 A | 10/2012 |
| CN | 202535428 U | 11/2012 |
| CN | 202548527 U | 11/2012 |
| CN | 102972024 A | 3/2013 |
| CN | 103164024 A | 6/2013 |
| CN | 203101796 U | 7/2013 |
| CN | 103235472 A | 8/2013 |
| CN | 103293838 A | 9/2013 |
| CN | 103309048 A | 9/2013 |
| CN | 103428472 A | 12/2013 |
| CN | 103529632 A | 1/2014 |
| CN | 103595986 A | 2/2014 |
| CN | 103595996 A | 2/2014 |
| CN | 203422528 U | 2/2014 |
| EP | 1 233 300 A1 | 8/2002 |
| EP | 2 096 870 A2 | 9/2009 |
| JP | 10-138794 A | 5/1998 |
| JP | 2011133514 A | 7/2011 |
| WO | 2013090100 A1 | 6/2013 |
| WO | 2013/128159 A1 | 9/2013 |

OTHER PUBLICATIONS

"International Search Report" dated Aug. 25, 2015 for International application No. PCT/CN2015/079979, International filing date:May 27, 2015.

"International Search Report" dated Aug. 26, 2015 for International application No. PCT/CN2015/079940, International filing date:May 27, 2015.

"International Search Report" dated Sep. 1, 2015 for International application No. PCT/CN2015/079933, International filing date: May 27, 2015.

Office Action dated Apr. 5, 2018 in co-pending U.S. Appl. No. 14/904,700 [citing references AA-AG, AO-AP therein] 34 pp.

* cited by examiner (A)

(B)

PROJECTION DISPLAY COMPONENT AND ELECTRONIC DEVICE

CROSS REFERENCE TO RELATED APPLICATIONS

This application claims the benefit of U.S. Provisional Application No. 62/003,260, filed on May 27, 2014, and U.S. Provisional Application No. 62/034,952, filed on Aug. 8, 2014. The entire contents of the related applications are incorporated herein by reference.

TECHNICAL FIELD

The present invention relates to an accessory component, and more particularly, to a projection display component.

BACKGROUND

Devices which can provide customers with high-quality visual effects are desirable because of the recent progress in multimedia entertainment systems. In particular, 3D display technology has been receiving more attention because of its superior visual effects and vivid images. For customers, using 3D glasses results in an uncomfortable experience, but holographic display is too expensive to be widely acceptable for most users.

SUMMARY

One of the objectives of the present invention is to provide a projection display component.

According to an embodiment of the present invention, a projection display component of an electronic device comprises: a carrier and a first cover, wherein the carrier is arranged to carry the electronic device, and the first cover is arranged to partially reflect a projected image from the electronic device. The first cover is attached to the carrier via a first hinge set.

According to another embodiment of the present invention, an electronic device to be carried by a projection display component comprises a projection source component, a user input device and a processor. The processor is arranged to drive the projection source component to project an image to a first cover of the projection display component. The projected image is partially reflected by the first cover. The processor is arranged to process a user input generated by the user input device for interacting with the projected image partially reflected by the first cover.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
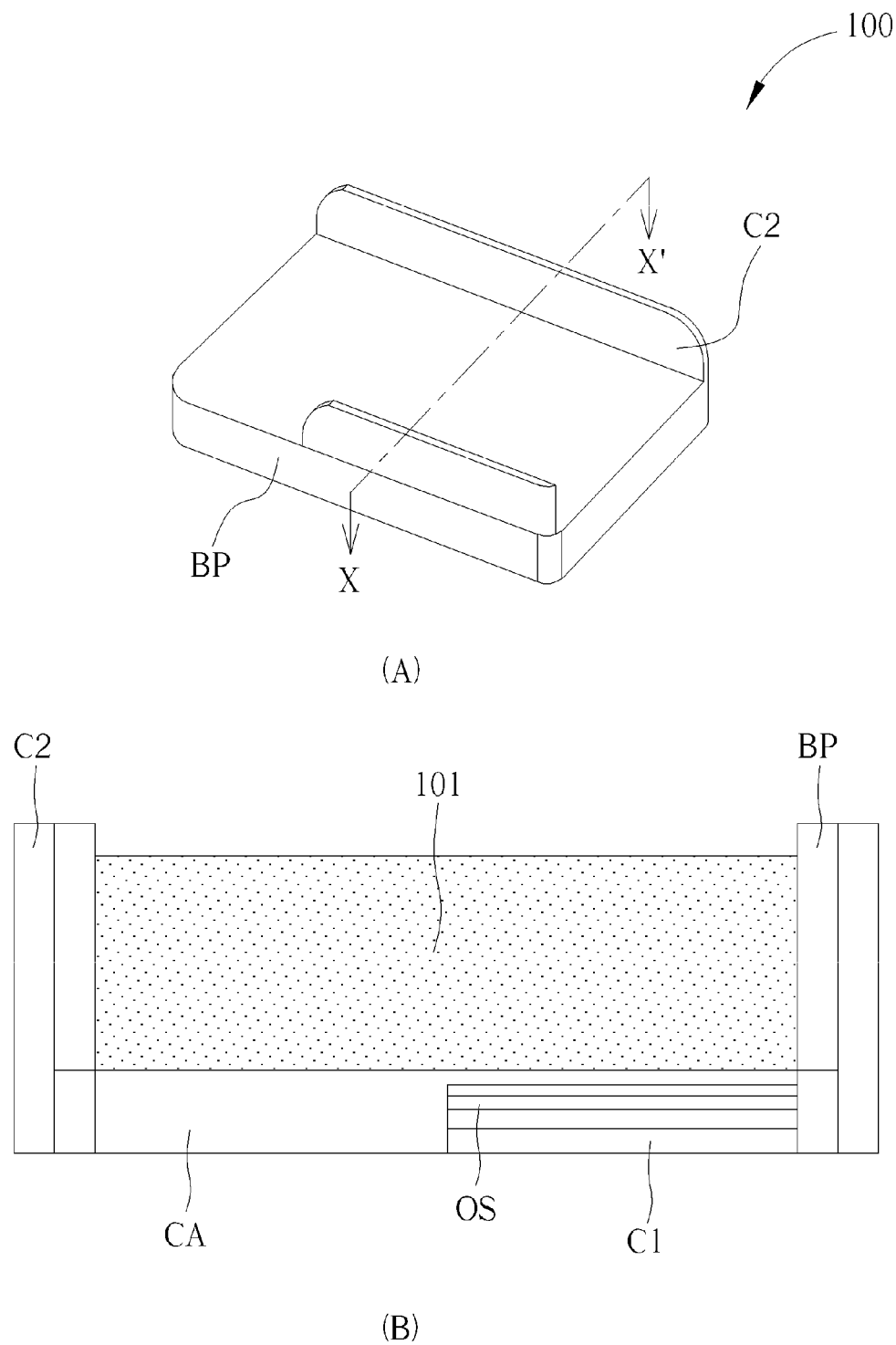
FIG. 1 is a schematic illustrating a projection display component of an electronic device according to an embodiment of the present invention.
Figure 2:
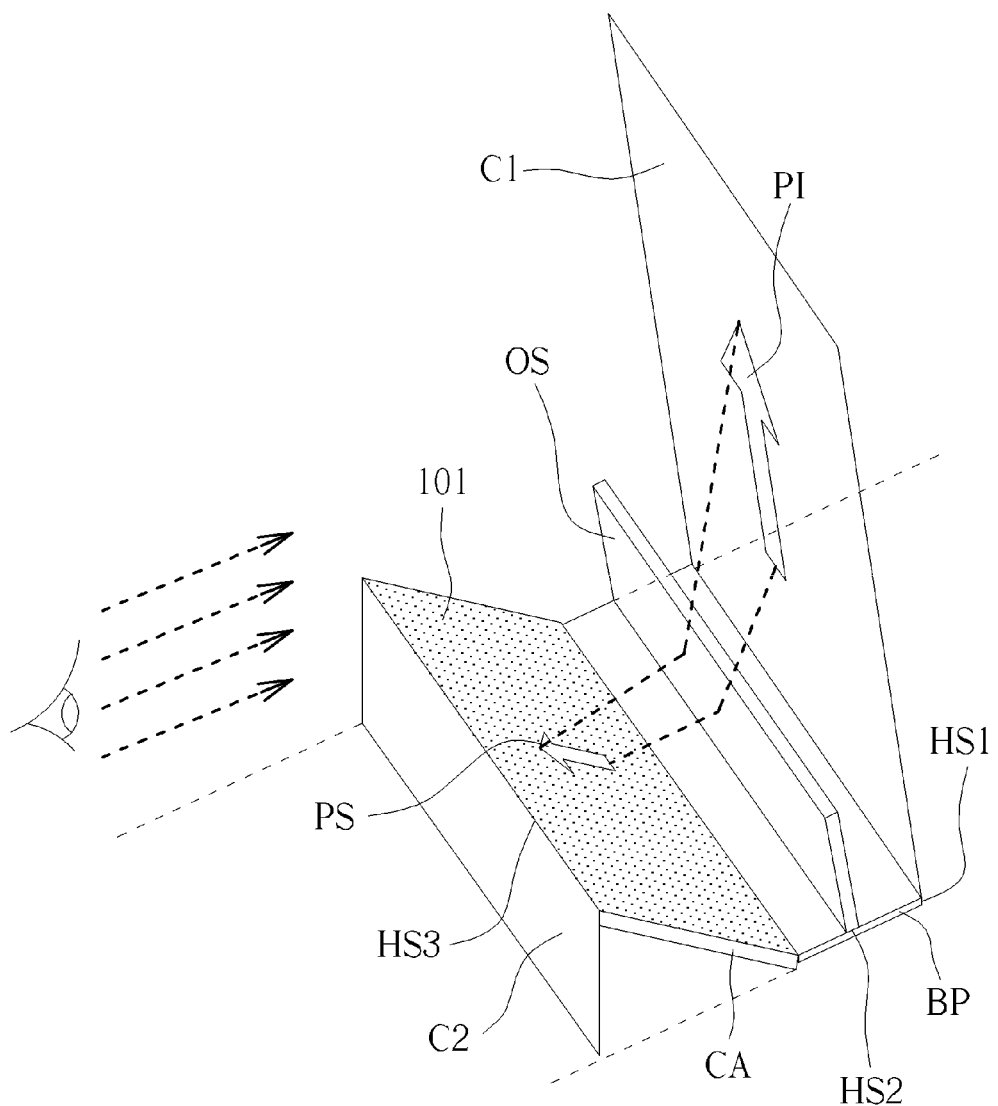
FIG. 2 is a diagram illustrating the projection display component unfolded for projection according to an embodiment of the present invention.

Refer to FIG. 1 and FIG. 2. FIG. 1 is a schematic illustrating a projection display component 100 of an electronic device 101 according to an embodiment of the present invention. The sub-diagram (A) of FIG. 1 shows a perspective view of the projection display component 100 for placing the electronic device 101. The sub-diagram (B) of FIG. 1 shows a sectional view along line X-X' of the electronic device 101 and the projection display component 100 shown in sub-diagram (A). It should be noted that the electronic device 101 may be integrated with the projection display component 100. However, it is not a limitation of the present invention. In other embodiments, the electronic device 101 may be placed onto a carrier of the projection display component 100 via physical connection, where the carrier is arranged to carry the electronic device. The carrier may be part of the electronic device 101 or an independent structure other than the electronic device 101. To put it simply, the present invention has no limitation on the engagement or integration of the electronic device 101 and the projection display component 100. Any electronic device using the proposed projection display component falls within the scope of the present invention.

FIG. 2 is a diagram illustrating the projection display component 100 which can be unfolded for projection according to an embodiment of the present invention. As shown in FIG. 1 and FIG. 2, the projection display component 100 is arranged to place the electronic device 101 and is also a projection set when it is unfolded. The projection display component 100 may comprise at least one of a carrier CA and a first cover C1, a second cover C2, a base plate BP and an optical set OS. When the projection display component 100 is unfolded for projection, as shown in FIG. 2, the first cover C1 is arranged to partially reflect an image of a projection source PS generated from the electronic device 101, such that a projected image PI may be shown through the first cover C1. In some embodiments, a display panel of the electronic device 101, such as an LCD panel or any other passive or active display panel, may be taken as a projection source component to display the image. In some other embodiments, a solid-state (laser or LED) light or any other type of light source may be taken as a projection source component to project the image. Accordingly, a user may see the projected image PI displayed on or behind the first cover C1. In detail, some intensity of the projected image PI may be projected through the first cover C1, and some other intensity of the projected image PI may be reflected by the first cover C1, such that the first cover C1 partially reflects the image of the projection source PS. As a result, a user may see the projected image displayed on the first cover C1 or floating behind the first cover C1, thereby forming a stereo viewing effect, especially for the projected image PI with 3d effect. The second cover C2 is arranged to adjust an angle between the second cover C2 and the electronic device 101, such that a projection direction of the projected image PI from the projection source PS to the first cover C1 may be adjusted. The base plate BP is arranged to adjust a distance between the first cover C1 and the electronic device 101, wherein the base plate BP is detachable, foldable or extendible. The optical set OS placed between the first cover C1 and the electronic device 101. The optical set OS is arranged to redirect a projected direction of the projected image, such that a user may see the projected image PI with adjusted size displayed on or behind the first cover C1. It should be noted that the projection display component 100 shown in FIG. 1 is only an example.

In the embodiment of FIG. 2, the first cover C1, the second cover C2, and the optical set OS may be attached to the base plate BP via a first hinge set HS1 (which may include one or more hinge mechanisms), a second hinge set HS2 (which may include one or more hinge mechanisms), and a third hinge set HS3 (which may include one or more hinge mechanisms), respectively. Therefore, a first angle between the base plate BP and the first cover C1, a second angle between the base plate BP and the second cover C2, and the angle between the second cover C2 and the electronic device 101 may be adjustable. In some embodiments, but not limitation, the first hinge set HS1, the second hinge set HS2, or the third hinge set HS3 may be implemented using magnetic hinge sets, so that the first cover C1, second cover C2 or the optical set may be detachable. The optical set or the second cover C2 may be removable. In some other embodiments, the first hinge set HS1, the second hinge set HS2, and the third hinge set HS3 may include any other hinge mechanisms, which should not be limited in this disclosure.

Figure 3:
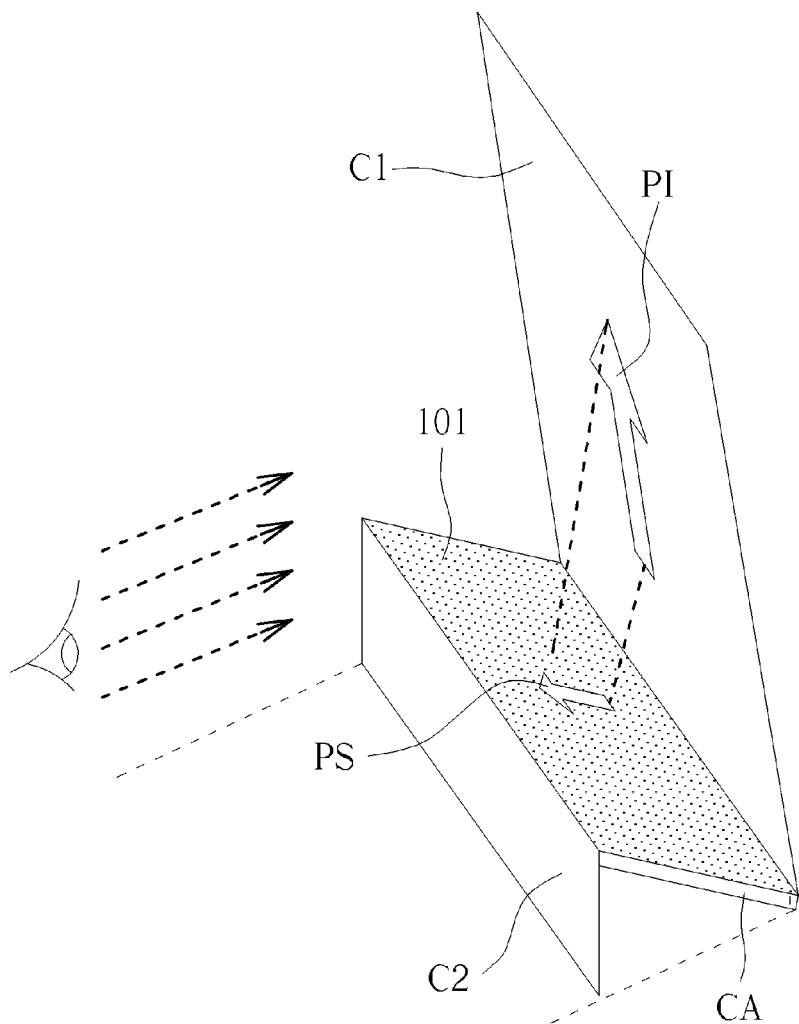
FIG. 3 is a diagram illustrating the projection display component unfolded for projection according to another embodiment of the present invention.

FIG. 3 is a diagram illustrating the projection display component unfolded for projection according to another embodiment of the present invention. As shown in FIG. 3, the projection display component may comprise a carrier CA, a first cover C1 and a second cover C2, wherein the first cover C1 is arranged to partially reflect a projection source PS generated from the electronic device 101, such that a projected image PI may be shown through the first cover C1, and the second cover C2 is arranged to adjust an angle between the second cover C2 and the electronic device 101, such that a projection direction of the projected image PI from the projection source PS to the first cover C1 may be adjusted. The optical set OS and the base plate BP may not be included in the embodiment of FIG. 3.

Figure 4:
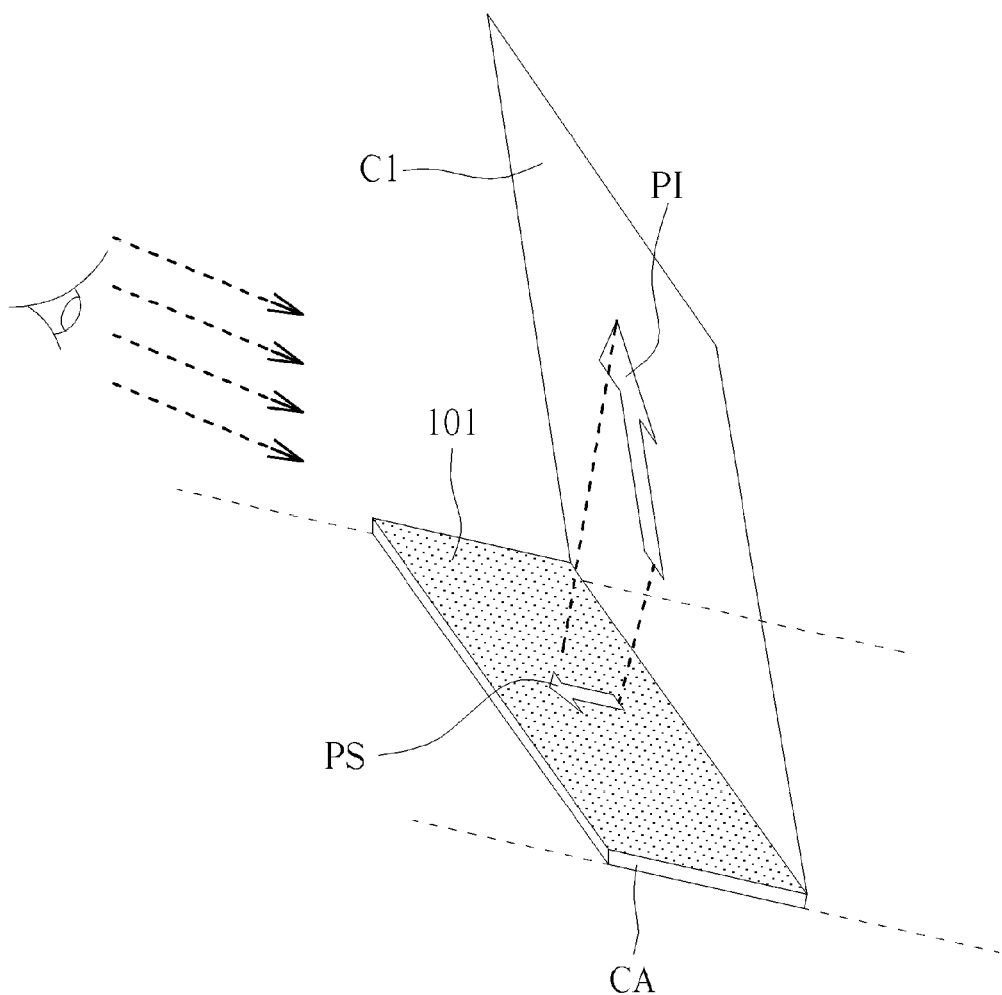
FIG. 4 is a diagram illustrating the projection display component unfolded for projection according to another embodiment of the present invention.

FIG. 4 is a diagram illustrating the projection display component unfolded for projection according to another embodiment of the present invention. As shown in FIG. 4, the projection display component may comprise a carrier CA, a first cover C1 for displaying a projected image PI of a projection source PS generated from the electronic device 101. In this embodiment, the electronic device 101 may be carried by the carrier CA for projection, and the optical set OS, the base plate BP and the second cover C2 may not be included.

Figure 5:
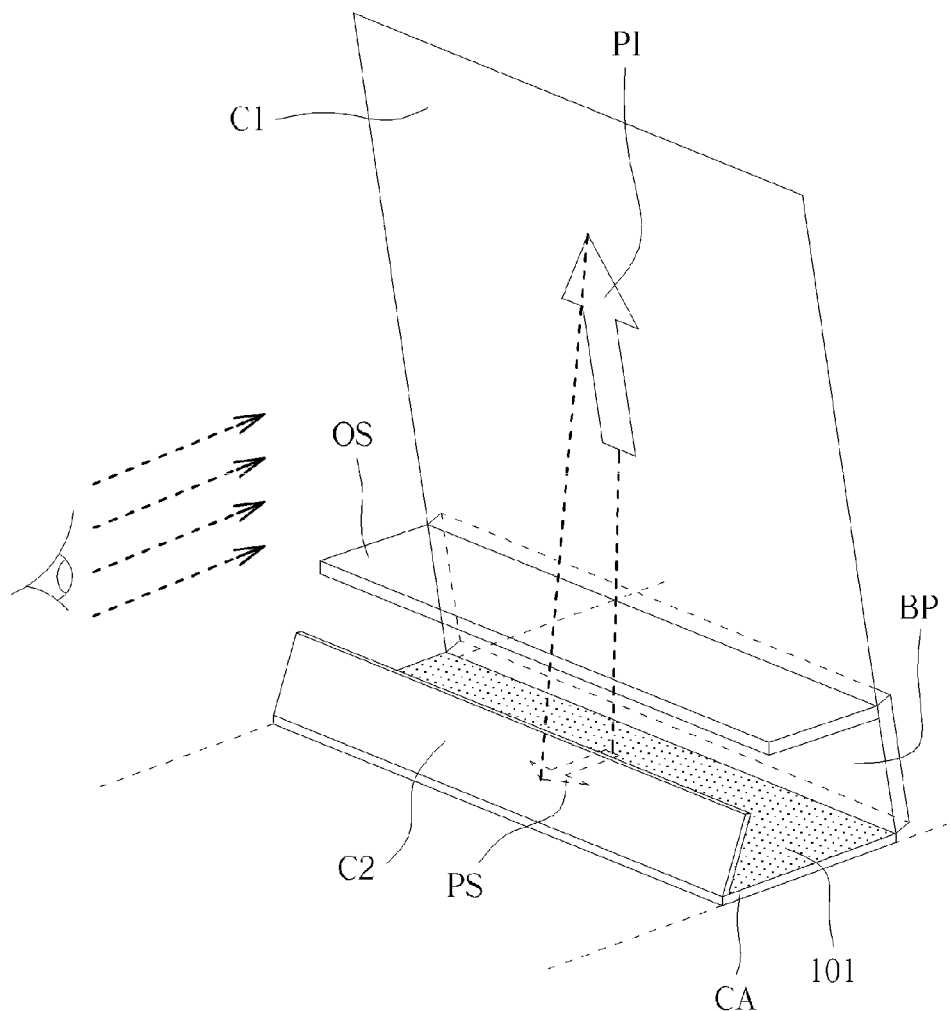
FIG. 5 is a diagram illustrating the projection display component unfolded for projection according to another embodiment of the present invention.

FIG. 5 is a diagram illustrating the projection display component unfolded for projection according to another embodiment of the present invention. The projection display component may comprise a carrier CA, a first cover C1, a second cover C2, a base plate BP and an optical set OS, wherein the first cover C1, the second cover C2, the base plate BP and the optical set OS are identical with the embodiment of sub-diagram (B) of FIG. 1, so the detailed description is omitted here. As shown in FIG. 5, the electronic device 101 is disposed on the carrier CA, and the second cover C2 can be disposed or rotated to a position fully/partially blocking the light of the electronic device, such as the light from the projection source PS, from reaching a user's eyes.

Figure 6:
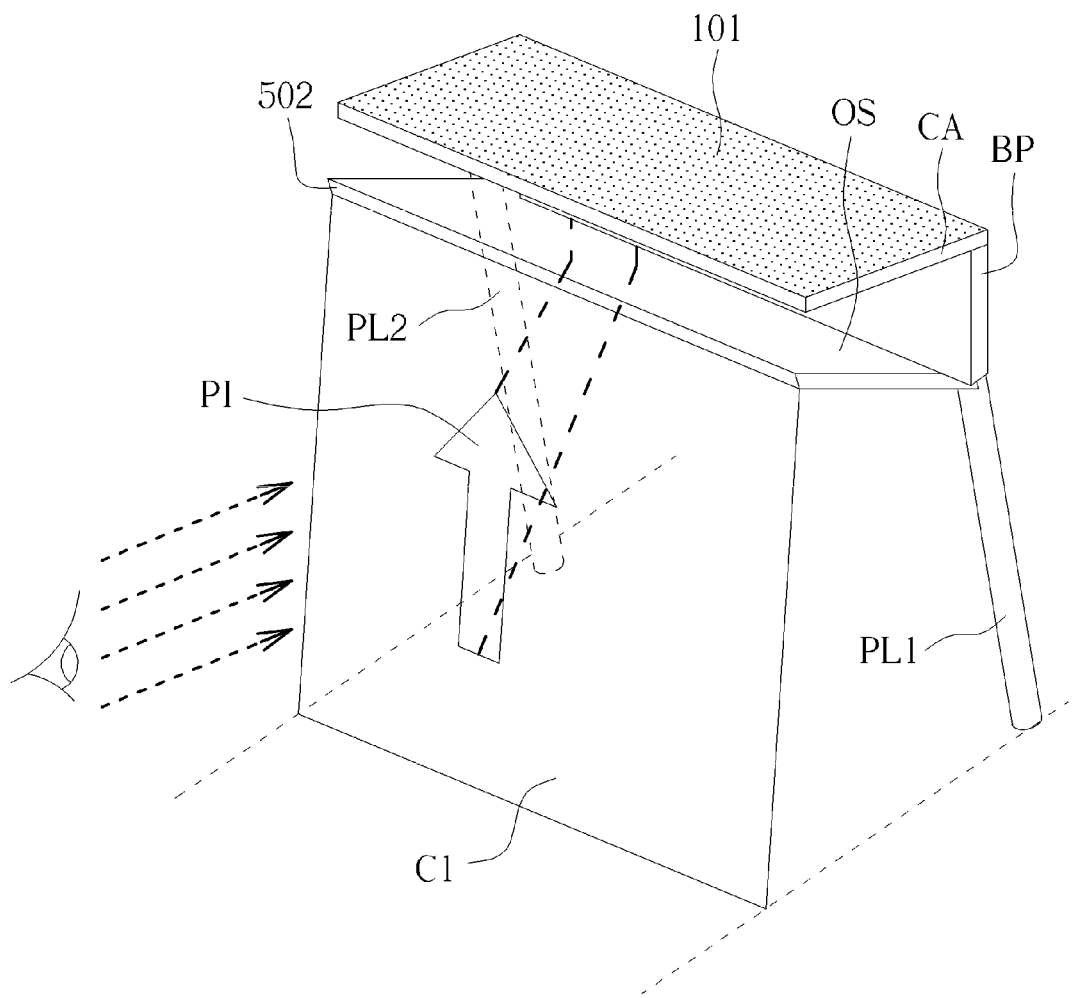
FIG. 6 is a diagram illustrating the projection display component unfolded for projection according to another embodiment of the present invention.

FIG. 6 is a diagram illustrating the projection display component unfolded for projection according to another embodiment of the present invention. The projection display component may comprise a carrier CA, a first cover C1, a base plate BP, and an optical set OS, and may further comprise at least one supporting element (for example, two pillars PL1 and PL2) attached to the base plate BP for supporting the electronic device 101. In this embodiment, the first cover C1 is attached to the optical set OS via a hinge set (such as, a magnetic hinge 502), such that the projected image PI may be shown through the first cover C1.

Figure 7:
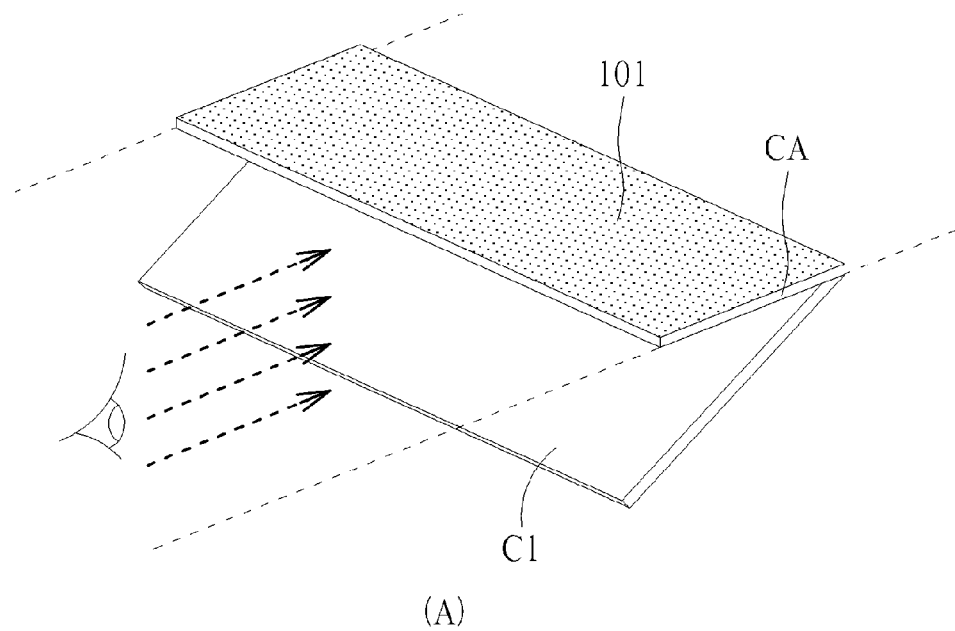
FIG. 7 is a diagram illustrating the projection display component unfolded for projection according to another embodiment of the present invention.
Figure 7:
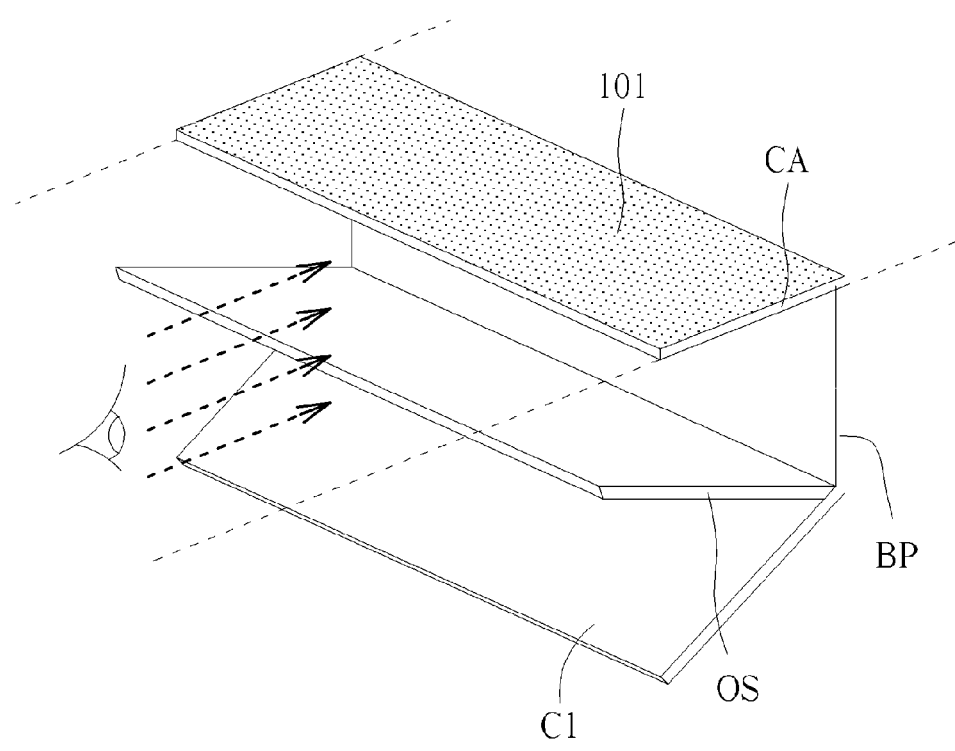

FIG. 7 is a diagram illustrating the projection display component unfolded for projection according to another embodiment of the present invention. As shown in the sub-diagram (A) of FIG. 7, the projection display component may comprise a carrier CA and a first cover C1. The electronic device 101 may be disposed above a user's eyes, so that the user can observe the projected image PI shown on or behind the first cover C1. The sub-diagram (B) of FIG. 7 is another embodiment for illustrating the projection display component unfolded for projection. In this embodiment, the projection display component may comprise a carrier CA, a first cover C1, a base plate BP and an optical set OS. Since the function of each element is identical with the elements described in the embodiment of FIG. 2, the detailed description is thus omitted here for brevity. In the embodiments of FIG. 7, the projection display component may be applied as a head-up display (HUD) for observing the projected image PI.

In the above embodiments, the optical set OS may comprise at least one convex lens. The optical set OS is not limited to be convex lens, however. In some other embodiments, the optical set OS may comprise any element capable of refracting the light generated from the electronic device to the first cover C1, such as mirrors, lenses, prisms.

Figure 8:
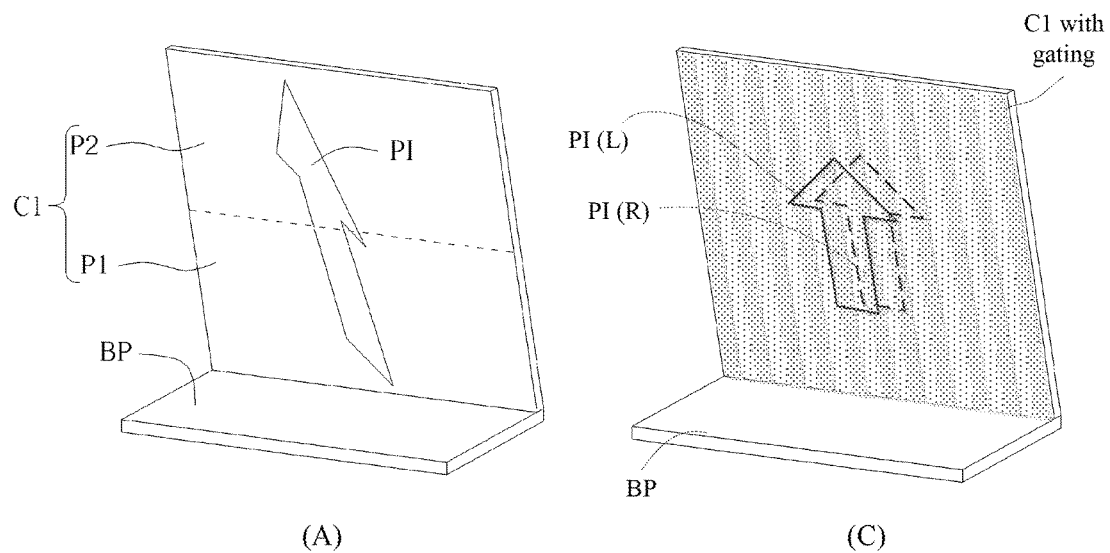
FIG. 8 is a diagram illustrating a first cover according to an embodiment of the present invention.
Figure 8:
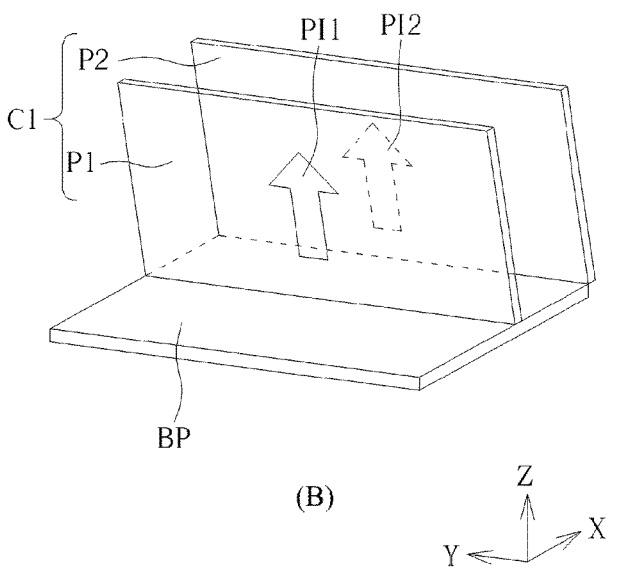

In the embodiments of FIG. 1 to FIG. 7, the first cover C1 comprises at least one non-opaque plate (e.g. transparent/semitransparent plate(s)), such that the projected image may be partially reflected. FIG. 8 is a diagram illustrating the first cover C1 according to an embodiment of the present invention. The first cover C1 comprises two non-opaque plates PI and P2, and these plates may be detachable. As shown in sub-diagram (A) of FIG. 8, the plates P1 and P2 can stack together to expend in the Z direction, such that the projected image PI with a larger size can be shown through the first cover C1. Alternatively, as shown in sub-diagram (B) of FIG. 8, the plates PI and P2 can be placed on different positions of the base plate BP, such that the projected images PI1 and PI2 can be shown through the plates PI and P2 respectively. These embodiments are only for illustrative purposes. In practice, the number of non-opaque plates included in the first cover C1 may be adjusted depending upon actual design considerations. In addition, the at least one non-opaque plate can be a flat plane or a curved plane, as long as it can obtain a better visual effect. In other embodiments, as shown in sub-diagram (C) of FIG. 8, the first cover C1 may be covered with optical gating for 3D display, such that the projected image shown through the first cover C1 may be in form of a 3D stereo content for left and right eyes (e.g., left-eye image PI(L) and right-eye image PI(R)). These alternative designs also fall within the scope of the present invention.

Figure 9:
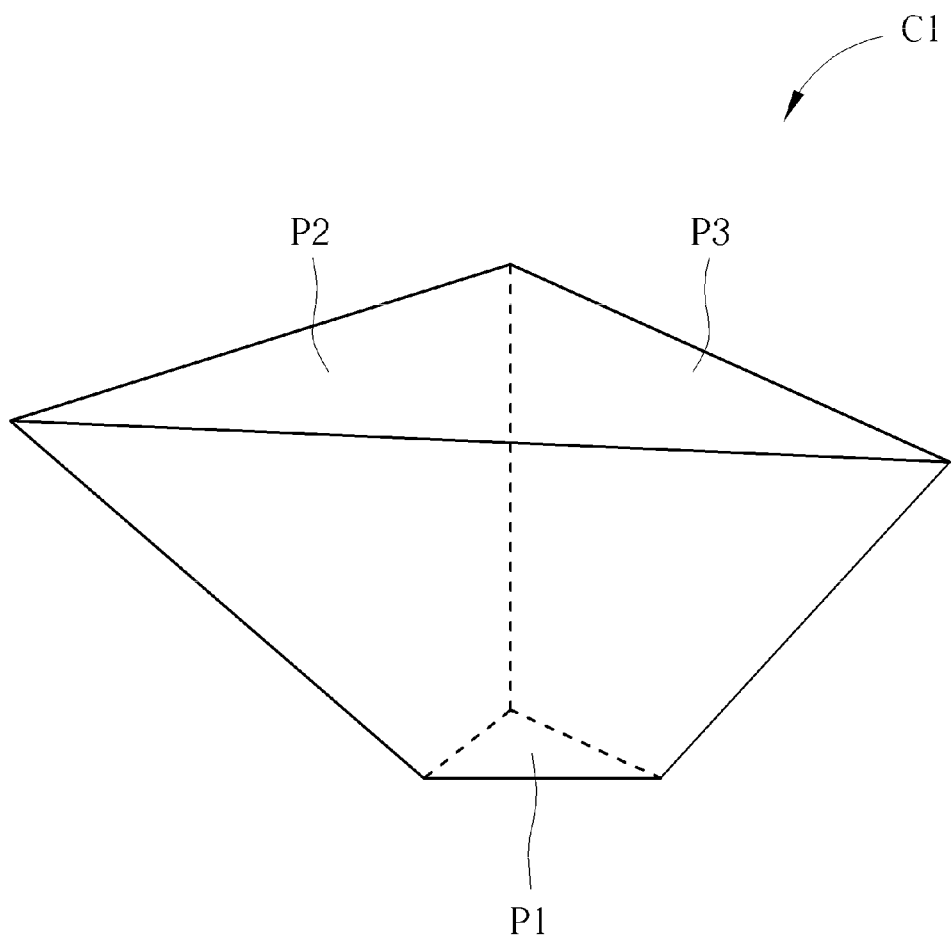
FIG. 9 is a perspective view of the first cover according to an embodiment of the present invention.

FIG. 9 is a perspective view of the first cover according to an embodiment of the present invention. As shown in FIG. 9, the non-opaque plates P1 to P3 included in the first cover C1 may constitute a structure which can provide three views of the projected image at three different viewpoints. The number of the non-opaque plates is not a limitation of the present invention, however. For example, the first cover C1 may comprise five or six non-opaque plates for providing a plurality of views at a plurality of different viewpoints for multiple users. The embodiment of projecting a plurality of views of the projected image will be discussed as follows.

Figure 10:
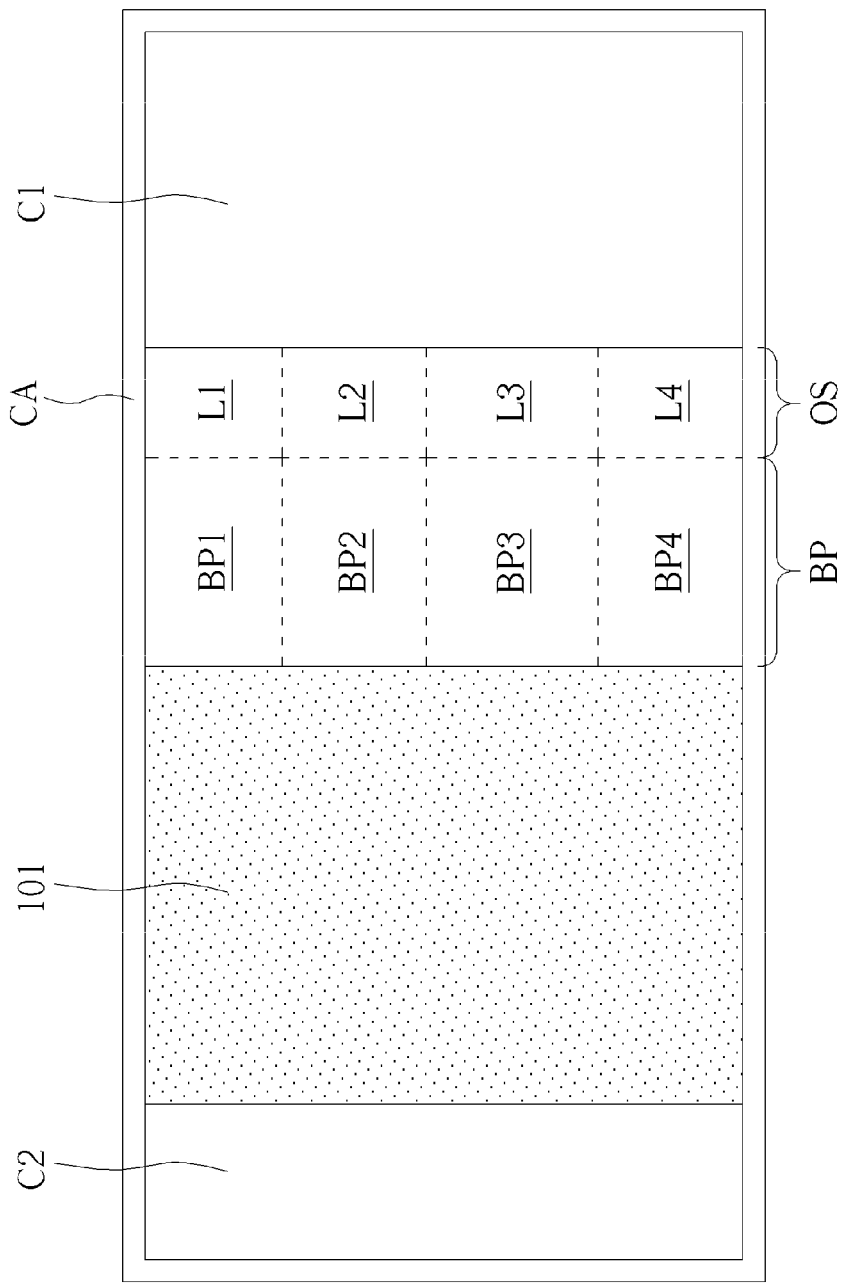
FIG. 10 is a schematic illustrating the projection display component of an electronic device for multiple users according to an embodiment of the present invention.

FIG. 10 is a diagram illustrating the projection display component of an electronic device 101 for multiple users or multiple viewpoints according to an embodiment of the present invention. The projection display component may comprise a base plate BP, an optical set OS, a first cover C1 and a second cover C2. In this embodiment, the base plate BP comprises four plates BP1, BP2 BP3 and BP4, and the optical set OS comprises four lenses L1, L2, L3 and L4.

Figure 11:
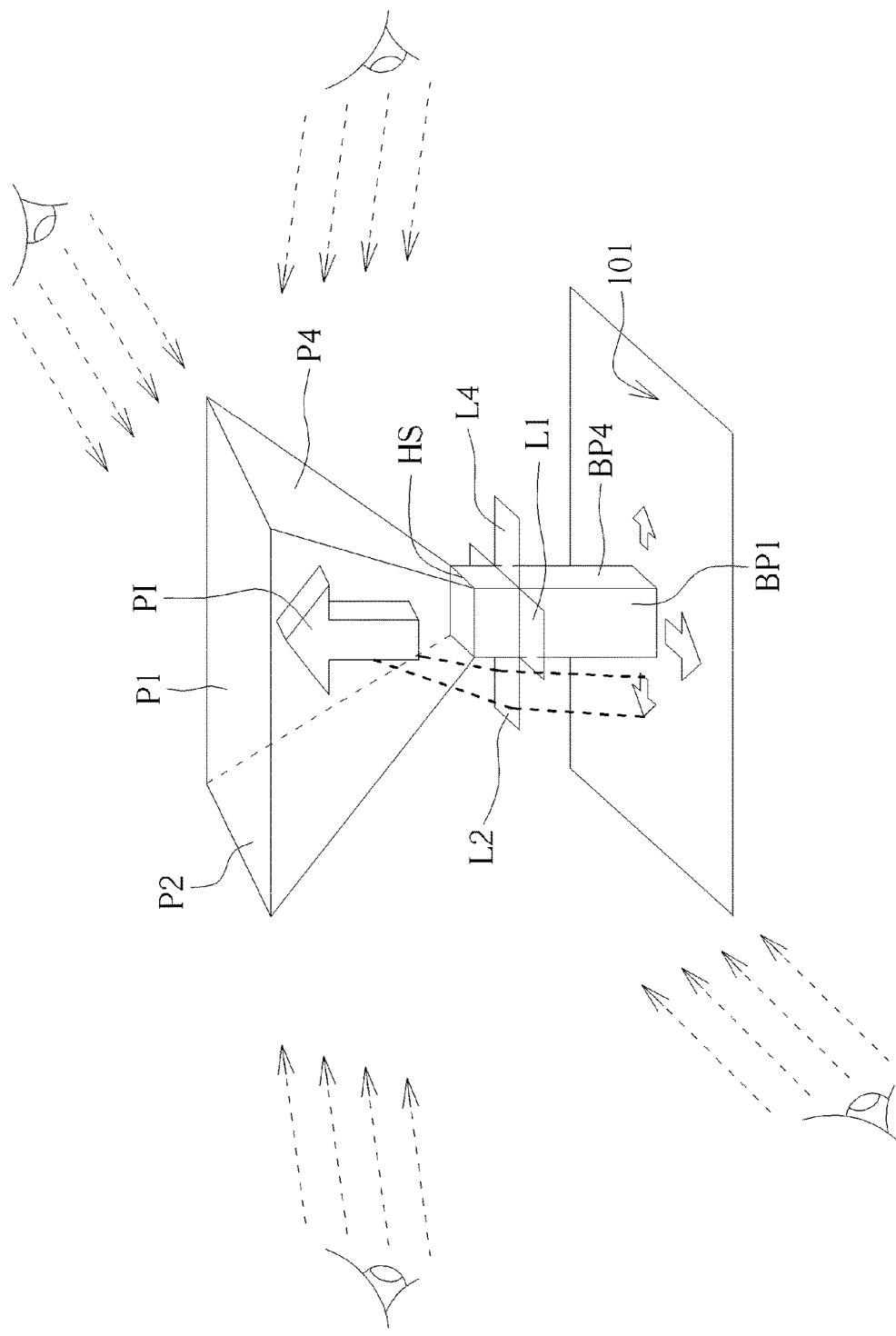
FIG. 11 is a diagram illustrating the projection display component unfolded for projection according to the embodiment of FIG. 8.

FIG. 11 is a diagram illustrating the projection display component unfolded for projection according to the embodiment of FIG. 10. As shown in FIG. 11, the base plates BP1 to BP4 constitute a cuboid for adjusting a distance between the first cover C1 and the electronic device 101, wherein the first cover C1 comprises four non-opaque plates P1 to P4, which may be placed or attached to the base plates BP1 to BP4 respectively via a hinge set HS (e.g. a magnetic hinge) and constitute a reverse triangular frustum for displaying four views of the projected image PI at four viewpoints. The lenses L1 to L4 may be placed or attached to the base plates BP1 to BP4, respectively, between the electronic device 101 and the plates P1 to P4. It should be noted that the embodiments of FIG. 10 and FIG. 11 are only for illustrative purposes, and not a limitation of the present invention. The base plate BP and the optical set OS can comprise different numbers of plates and lenses, for example, five or six, and the non-opaque plates included in the first cover C1 may constitute a different shape instead of a reverse triangular frustum for providing a plurality of views of the projected image PI at a plurality of different viewpoints. The skilled person in the art should understand the implementation readily after reading the abovementioned embodiments.

Figure 13:
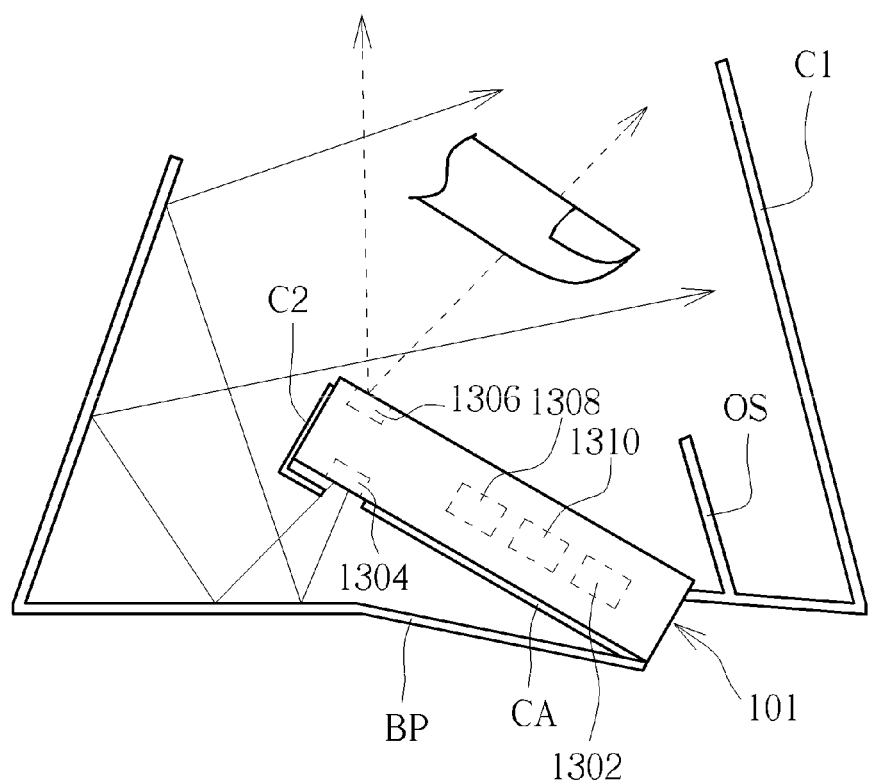
FIG. 13 is a diagram illustrating the rear camera capturing a gesture signal reflected from the base plate according to an embodiment of the present invention.

In one embodiment of this invention, an electronic device may be carried by the projection display component illustrated in the embodiments of FIG. 1 to FIG. 11. The electronic device may include a projection source component, a user input device and a processor. The projection source component may be a display panel (e.g. an LCD panel or any other passive or active display panel), a solid-state light (e.g. laser, LED or any other type of light source) or any other type of hardware for projecting images. The processor drives the projection source component to project an image to a first cover of the projection display component. The projected image is partially reflected by the first cover. When an interactive mode of the electronic device 101 is on, a processor 1302 in the electronic device 101 as shown in FIG. 13 may process a user input generated by the user input device for interacting with the projected image partially reflected by the first cover C1. The user input may be a gesture input, an ultrasound wave input, a voice input, any other type of user input, or combination thereof. The associated preferable embodiments will be discussed in the following paragraphs. Please note that, the position of the processor 1302 in FIG. 13 is just for the purpose of illustration rather than limitations.

Figure 12:
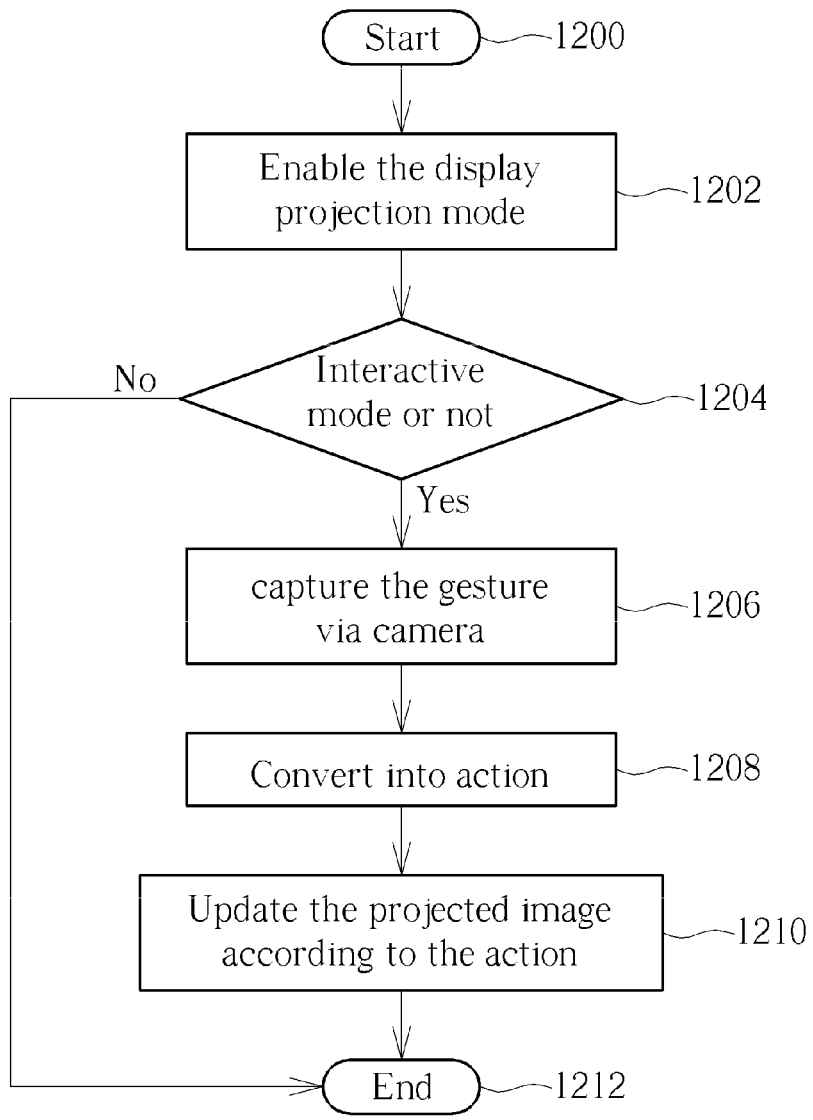
FIG. 12 is a flowchart illustrating the interaction with gesture input according to an embodiment of the present invention.

FIG. 12 is a flowchart illustrating the interaction with gesture input according to an embodiment of the present invention. The description of the flow of FIG. 12 is described as follows:

Step 1200: Start.

Step 1202: The user may enable the projection display mode of the electronic device.

Step 1204: If the interactive mode is on may be determined. If yes, go to step 1206; otherwise, go to step 1212.

Step 1206: Capture the user's gesture input via a front camera 1306 of the electronic device 101. Please note that, the position of the front camera 1306 in FIG. 13 is just for the purpose of illustration rather than limitations.

Step 1208: Convert the gesture input into a corresponding action.

Step 1210: Update the projected image according to the corresponding action.

Step 1212: End.

In step 1206, the user may control the projected image PI with a gesture which is captured by the front camera 1306. Then in step 1208, the processor 1302 may recognize the gesture input captured by the front camera 1306 and convert it into a corresponding instruction. In step 1210, the processor 1302 updates the projected image PI according to the corresponding instruction (e.g. the projected image PI may be adjusted correspondingly). For example, the user pulls the projected image PI up, and this move is captured by the front camera 1306. The processor 1302 converts this move into a corresponding action for the projected image PI, and then updates the projected image PI, so that the projected image PI goes up corresponding to the gesture the user made.

In the embodiment of FIG. 13, the processor 1302 captures the gesture input via the front camera 1306 of the electronic device 101; however, in other embodiments, a rear camera 1304 of the electronic device 101 is used for capturing the gesture input. FIG. 13 also provides an embodiment illustrating the rear camera 1304 capturing a gesture signal reflected from the base plate of the projection display component according to an embodiment of the present invention. As shown in FIG. 13, the rear camera 1304 of the electronic device 101 captures the gesture signal via the reflection from the base plate BP. In this way, the rear camera 1304 may be able to capture a wider range of gesture signals than the front camera 1306. Please note that, the position of the rear camera 1304 in FIG. 13 is just for the purpose of illustration rather than limitations.

Figure 14:
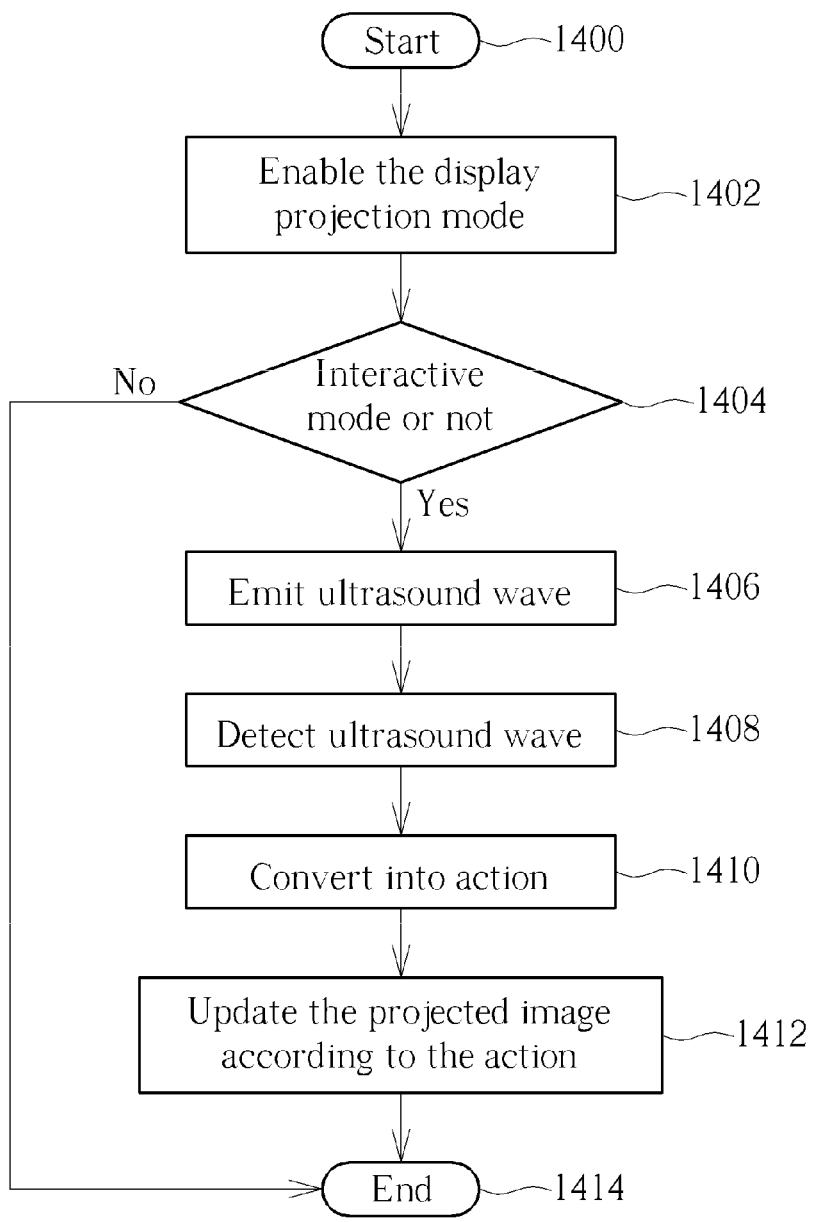
FIG. 14 is a flowchart illustrating the interaction by using ultrasound wave according to an embodiment of the present invention.

FIG. 14 is a flowchart illustrating the interaction by using ultrasound wave according to an embodiment of the present invention. The description of the flow of FIG. 14 is described as follows:

Step 1400: Start.

Step 1402: The user enables the projection display mode.

Step 1404: The processor determines if the interactive mode is on. If yes, go to step 1406; otherwise, go to step 1414.

Step 1406: a speaker 1310 emits ultrasound wave to detect the user's gesture. Please note that, the position of the speaker 1310 in FIG. 13 is just for the purpose of illustration rather than limitations.

Step 1408: The processor 1302 detects the reflected ultrasound wave or wave bounce back via a microphone 1308 of the electronic device 101. Please note that, the position of the microphone 1308 in FIG. 13 is just for the purpose of illustration rather than limitations.

Step 1410: The processor 1302 converts the reflected ultrasound or the wave bounce back detected by the microphone 1308 into a corresponding action.

Step 1412: The processor 1302 updates the projected image according to the corresponding action.

Step 1414: End.

In this embodiment, the speaker 1310 emits ultrasound wave to detect the user's gesture, and the processor 1302 detects the reflected ultrasound wave via the microphone 1308, and converts the reflected ultrasound wave into the corresponding action.

Figure 15:
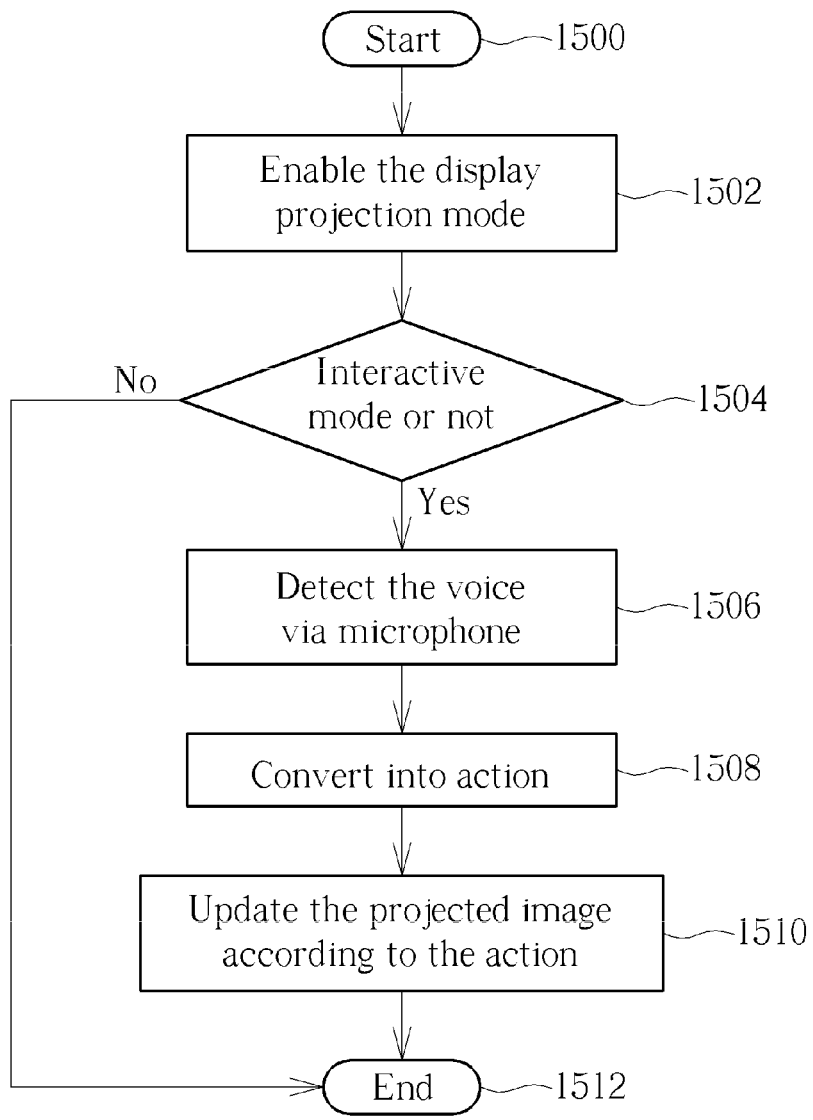
FIG. 15 is a flowchart illustrating the interaction with voice input according to an embodiment of the present invention.

FIG. 15 is a flowchart illustrating the interaction according to an embodiment of the present invention. The description of the flow of FIG. 15 is described as follows:

Step 1500: Start.

Step 1502: The user may enable the projection display mode.

Step 1504: The processor 1302 may determine if the interactive mode is on. If yes, go to step 1506; otherwise, go to step 1512.

Step 1506: The processor 1302 detects a user input via a microphone 1308 of the electronic device 101. In one embodiment, the user may operates the electronic device to control a speaker of the electronic device to emit a sound wave, such that the sound wave may be detected via the microphone 1308 and a corresponding sound input may be generated via the microphone 1308. In another embodiment, the user may speak to the microphone 1308 and a corresponding voice input may be generated via the microphone 1308.

Step 1508: The processor 1302 converts the voice or sound input into a corresponding action.

Step 1510: The processor 1302 updates the projected image according to the corresponding action.

Step 1512: End.

The interactive method is not limited in the embodiment of FIG. 12 to FIG. 15. In one embodiment, the first cover C1 may be a touch panel, and the user can interact with the projected image on the first cover C1 by touching the first cover C1. The person skilled in the art should understand the implementation readily after reading the above paragraphs.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. An electronic device to be carried by a projection display component, comprising:
    a projection source component on a first side of the electronic device;
    a rear camera on a second side of the electronic device; and
    a processor configured to:
        drive the projection source component to project a projected image to a first cover of the projection display component, wherein the first cover is configured to partially reflect the projected image;
        process a gesture input that is reflected from a base plate of the projection display component and captured by the rear camera; and
        update the projected image according to the processed gesture input.

2. The electronic device of claim 1, further comprising a front camera to capture the gesture input.

3. The electronic device of claim 1, wherein the processor is configured to convert the gesture input into a corresponding action and update the projected image according to the corresponding action.

4. The electronic device of claim 1, further comprising a microphone to detect an ultrasound input, the processor being configured to convert the ultrasound input into a corresponding action and update the projected image according to the corresponding action.

5. The electronic device of claim 1, further comprising a microphone to detect a voice input, the processor being configured to convert the voice input into a corresponding action and update the projected image according to the corresponding action.

* * * * *